(No Model.)

F. G. SCHMIDT.
EYEGLASSES.

No. 499,756. Patented June 20, 1893.

WITNESSES:
John A. Rennie
C. K. Fraser.

INVENTOR:
Fritz G. Schmidt,
By his Attorneys,
Arthur C. Fraser & Co.

UNITED STATES PATENT OFFICE.

FRITZ G. SCHMIDT, OF NEW YORK, N. Y.

EYEGLASSES.

SPECIFICATION forming part of Letters Patent No. 499,756, dated June 20, 1893.

Application filed February 8, 1893. Serial No. 461,477. (No model.)

*To all whom it may concern:*

Be it known that I, FRITZ G. SCHMIDT, a resident of the city, county, and State of New York, have invented certain new and useful Improvements in Eyeglasses, of which the following is a specification.

This invention relates to eye glasses and analogous devices which are maintained in position by the nose of the user, and is designed to provide certain improvements in the supporting clips or nose rests of such devices.

Heretofore the nose clips of eye glasses have been constructed with a plurality of contact points for engaging the nose, for each lens, of which class that shown in my Letters Patent dated October 4, 1892, No. 483,812, is an example. My present invention aims to provide an improved nose clip of this character, and to this end in carrying out the invention I provide certain improvements in the construction of the clip which will be hereinafter fully set forth.

Figure 1:
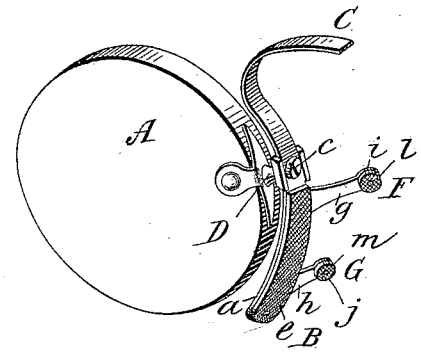
Figure 2:
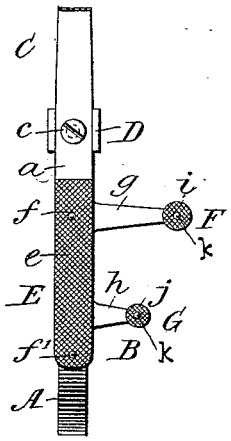
Figure 3:
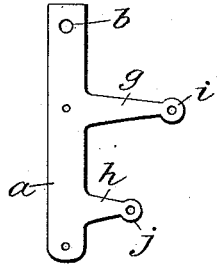
Figure 4:
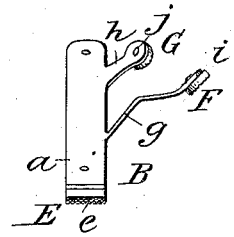

In the accompanying drawings, which illustrate the preferred form of my invention, Figure 1 is a perspective view of one half of a frameless eye glass, its nose piece and spring, constructed according to my invention. Fig. 2 is a cross section through the spring of the eye glass, showing the clip in elevation. Fig. 3 is a face view of the nose piece or clip alone, and Fig. 4 is a plan view of the clip showing it adjusted for use.

Referring to the drawings let A indicate the lens of an eye glass, which may be constructed with or without the usual lens frames, B the nose piece, C the spring bridge between and connecting the lenses, and D the usual stud securing the lens and spring together and carrying the nose piece.

The nose piece B consists of the usual long nose rest E extending in the plane of the lenses for engaging a considerable portion of the front of the nose of the user. This nose rest is constructed as heretofore of a long strip *a* of soft metal, having a screw hole *b* at its upper end and constructed on its rear face at top to be secured directly to and within the stud D. As heretofore, it is attached to this stud by a screw *c* traversing its hole *b* and engaging the stud. As usual the strip *a* is straight, and projects downwardly in the plane of the lenses, and can be bent to any desired curve. As heretofore, it is adapted on its front face to receive directly the shell or equivalent contact pad *e*, that shown being a shell pad having a roughened face. As usual the pad and strip are fastened together by rivets *f f'* passing through both and clinched to fix the two together.

According to my invention I provide two auxiliary rearwardly disposed nose rests F and G, carried by the strip *a* of the usual nose rest E by means of intermediate shanks *g* and *h*. Preferably the shanks are formed integrally with the strip *a* and project at right angles rearwardly therefrom, being narrow slender arms capable of being twisted or bent into any desired position for adjusting the clip to the nose of the user. Preferably they have enlarged heads *i* and *j* respectively at their rear ends, corresponding in size and shape to the size and shape of the corresponding pads, and centrally perforated to receive rivets *k k* for fastening the pad to the head. The heads *i* and *j* are adapted to receive the pad directly upon their front faces, and are polished on their rear faces which are smooth and flat by preference. The auxiliary pad F is at top, its arm *g* projecting rearwardly from the strip *a* near the upper end of the shell pad *e* thereof, and extending rearwardly a considerable distance, whereby its pad F may be brought close to the corner of the eye of the user, and is susceptible of extensive adjustment in any direction to meet the various requirements. The auxiliary pad G is below the pad F, and is preferably about half the distance from the usual pad E as is the upper pad, and is near the lower end of the usual pad E. Its arm *h* is consequently much shorter than is the upper arm *g*, and hence it is not capable of such extensive adjustment as is the latter, but this is not disadvantageous since the adjustment required for the lower pad is not so great as that for the upper. The pads F and G and their respective heads *i* and *j* are preferably circular in form. Those shown consist of shell pieces *l m* respectively, having roughened front faces.

My improved clip can be readily made by punching the strip *a*, arms *g h* and heads *i j* integrally out of a flat sheet of suitable metal, thus giving a blank having the shape shown in Fig. 3.

In operation, the shells being riveted to the respective points of the blank, the clip is attached to the stud D, and then the glasses are fitted to the nose of the user by giving the requisite adjustment to each of the nose pads. This adjustment will vary according to the shape of the nose of the user. Further adjustment of either auxiliary pad can be made by the user himself by simply grasping the pad and twisting its shanks as desired.

It will be seen that my invention provides an improved nose clip for eye glasses having three nose pads, which can be conveniently adjusted to afford complete stability in the support of the glasses, and that the pads are disposed most advantageously for comfort in wearing the glasses. The clip is extremely simple and cheap in construction.

One example of the adjustment of the auxiliary pads is illustrated in Fig. 4.

What I claim is, in eye glasses or analogous devices, the following defined novel features and combinations, substantially as hereinbefore set forth, namely:

1. The improved nose piece for eye glasses or analogous devices consisting of the usual nose pad E, extending substantially in the plane of the glasses for engagement with the forward portion of the nose of the user, in combination with two auxiliary nose pads F and G, one above the other, and both supported from said pad E, said auxiliary pad F being disposed a sufficient distance at the side of said pad E to engage the nose near the corner of the eye of the user, and said auxiliary pad G being disposed beneath said pad F and nearer than the latter to said pad E, substantially as and for the purpose set forth.

2. The improved nose piece for eye glasses consisting of the metallic strip $a$, having screw hole $b$ at top, constructed on its rear face to be attached directly to the eye glass and on its front face to receive the nose pad E extending in the plane of the lenses of the glass, in combination with the arm $g$ carried by said strip near its upper end and projecting laterally therefrom and having the head $i$ at its inner end adapted to receive and carry an auxiliary nose pad F, and the arm $h$ carried by said strip near its lower end projecting laterally therefrom and having a head $j$ closer to said strip than said head $i$ and adapted to carry an auxiliary pad G, substantially as and for the purpose set forth.

3. The improved nose piece for eye glasses, consisting of the long metal strip $a$, having a long slender integral arm $g$ projecting laterally from the rear edge of said strip near its upper end and constructed with head $i$ for carrying a nose pad, and a short slender integral arm $h$ below said arm $g$ projecting laterally from the rear edge of said strip and having head $j$ for carrying an auxiliary nose pad, substantially as and for the purpose set forth.

4. In eye glasses the combination with the lenses their studs, and the intermediate bridge, of nose pieces consisting respectively of the long nose pad E projecting in the plane of the lenses, the auxiliary nose pad F near the upper end of said pad E and disposed at the side of the latter, and the auxiliary nose pad G disposed at the side of said pad E, a less distance therefrom than said pad F and below the latter, a strip of metal $a$ supporting said pad E and connected at its rear face to the stud of the adjacent lens, long arm $g$ carrying said auxiliary pad F and connected to said strip $a$ and short arm $h$ carrying said auxiliary pad G and connected to said strip $a$, substantially as and for the purpose set forth.

In witness whereof I have hereunto signed my name in the presence of three subscribing witnesses.

FRITZ G. SCHMIDT.

Witnesses:
 EDMUND J. BLAKE,
 F. W. HADACEK,
 PHILIP A. MORRIS.